(12) United States Patent
Puskarich et al.

(10) Patent No.: US 9,979,259 B2
(45) Date of Patent: May 22, 2018

(54) ELECTROMAGNETIC LEVITATOR

(71) Applicant: Apple Inc., Cupertino, CA (US)

(72) Inventors: Paul Puskarich, Palo Alto, CA (US);
Clark D. Della Silva, San Francisco, CA (US); Charles A. Schwalbach, Menlo Park, CA (US); David Samuel Kumka, San Francisco, CA (US); Andy Weidner, San Francisco, CA (US); Paulina Mustafa, San Francisco, CA (US); Jean-Marc Gery, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 269 days.

(21) Appl. No.: 14/837,924

(22) Filed: Aug. 27, 2015

(65) Prior Publication Data

US 2017/0063194 A1    Mar. 2, 2017

(51) Int. Cl.
*H02K 7/09* (2006.01)
*H02K 11/215* (2016.01)
*F16C 32/04* (2006.01)

(52) U.S. Cl.
CPC .......... *H02K 7/09* (2013.01); *F16C 32/0444* (2013.01); *F16C 32/0446* (2013.01); *F16C 32/0453* (2013.01); *F16C 32/0457* (2013.01); *H02K 11/215* (2016.01)

(58) Field of Classification Search
CPC ...................................... H02K 7/09
USPC ...................................... 310/68 B
See application file for complete search history.

(56) References Cited

U.S. PATENT DOCUMENTS

| | | | | |
|---|---|---|---|---|
| 4,585,282 A * | 4/1986 | Bosley | ............... | F16C 32/0451 |
| | | | | 104/284 |
| 5,168,183 A * | 12/1992 | Whitehead | ............ | F16C 32/044 |
| | | | | 104/284 |
| 5,332,987 A * | 7/1994 | Hennessy | ............. | H02N 15/00 |
| | | | | 310/90.5 |
| 7,185,590 B2 * | 3/2007 | Fu | ........................... | H02N 1/08 |
| | | | | 104/281 |
| 7,348,691 B2 * | 3/2008 | Davis | .................... | A63H 33/26 |
| | | | | 104/284 |
| 8,647,166 B2 * | 2/2014 | Orozco | ................. | A63H 23/14 |
| | | | | 335/219 |
| 9,245,679 B1 * | 1/2016 | Termain | ............. | A47G 23/0241 |
| 2007/0170798 A1 * | 7/2007 | Gohin | .................... | H02N 15/00 |
| | | | | 310/90.5 |
| 2008/0026669 A1 * | 1/2008 | Rehkemper | ............. | A63H 3/28 |
| | | | | 446/301 |
| 2012/0062061 A1 * | 3/2012 | Belisle | ................. | B64C 39/001 |
| | | | | 310/90.5 |
| 2013/0309935 A1 * | 11/2013 | Olson | ..................... | A63H 3/20 |
| | | | | 446/330 |

(Continued)

*Primary Examiner* — Forrest M Phillips
(74) *Attorney, Agent, or Firm* — Sterne, Kessler, Goldstein & Fox P.L.L.C.

(57) ABSTRACT

A levitator is disclosed. The levitator may include a repulsion wire coil having a vertical coil axis, a position control wire coil having a vertical coil axis, a rotation control wire coil having a horizontal coil axis, and a controller coupled to each of the repulsion wire coil, position wire coil, and rotation wire coil, where the controller is configured to independently control currents provided to each of the repulsion wire coil, position wire coil, and rotation wire coil to levitate an item.

51 Claims, 13 Drawing Sheets

(56) References Cited

U.S. PATENT DOCUMENTS

| | | | | |
|---|---|---|---|---|
| 2014/0062239 A1* | 3/2014 | Schoeb | .................... | H02K 7/09 310/90.5 |
| 2015/0054499 A1* | 2/2015 | Musha | ................... | G01D 5/245 324/207.25 |
| 2015/0236621 A1* | 8/2015 | Van Lievenoogen | .. | H02N 15/00 310/90.5 |
| 2015/0303768 A1* | 10/2015 | Henderson | .............. | B60L 13/04 310/90.5 |
| 2016/0039310 A1* | 2/2016 | Melvin | ................... | B60L 13/04 180/65.8 |
| 2017/0012491 A1* | 1/2017 | Schob | ..................... | H02K 7/09 |

\* cited by examiner

ELECTROMAGNETIC LEVITATOR

FIELD

The described embodiments relate generally to systems and devices for levitating objects. More particularly, the present embodiments relate to levitating objects using magnetic fields.

BACKGROUND

Objects with opposing magnetic fields will repel each other. By positioning one below the other, the top object can be made to levitate above the bottom object by this repulsive force.

SUMMARY

Some embodiments of the present invention provide a levitator including a repulsion wire coil having a vertical coil axis, a position control wire coil having a vertical coil axis, and a rotation control wire coil having a horizontal coil axis. The levitator may also include a controller coupled to each of the wire coils, to independently control currents provided to each of the wire coils.

Some embodiments of the present invention provide a levitation system including a levitator with wire coils that produce a magnetic field when energized. The system may also include a magnetic-field-producing item—like a permanent magnet—that becomes levitated above the energized wire coils by the magnetic field when the magnetic-field-producing item is positioned above the energized wire coils. A controller may dynamically control the vertical and lateral position, and orientation, of the magnet by controlling the current energizing the wire coils.

Some embodiments of the present invention provide a method for controlling a levitated item by producing a repulsive magnetic field to levitate a magnetic-field-producing item—like a permanent magnet—, and constraining motion of the magnetic-field-producing item in greater than three degrees of freedom by energizing wire coils with electrical current.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a levitation system that can levitate an item. The levitator of the levitation system may include sensors that can detect the position (including orientation) and motion of the levitated item, and can adjust the position and motion of the levitated item based on its detected position. In this way, the levitated item can be maintained in a desired location even if it is moved (e.g., by an outside force), and/or can be controlled to move. Such movement (or lack thereof) can be predetermined by being preprogrammed into a control system of the levitator, or can be changeable in real time by being controlled by a real-time input such as from a control panel or audio signal.

Levitators as described may be used in a retail setting to display items for sale or display. Levitating an item may help bring attention to it and may present it to a consumer in a way that is easy to view and, in some cases, pick up and manipulate. By moving the item with the levitator, a retailer can further make it stand out to a customer (e.g., by bouncing or rotating it) and can better display all sides of the item to the customer.

These and other embodiments are discussed below with reference to the figures. However, those skilled in the art will readily appreciate that the detailed description given herein with respect to these figures is for explanatory purposes only and should not be construed as limiting.

Figure 1:
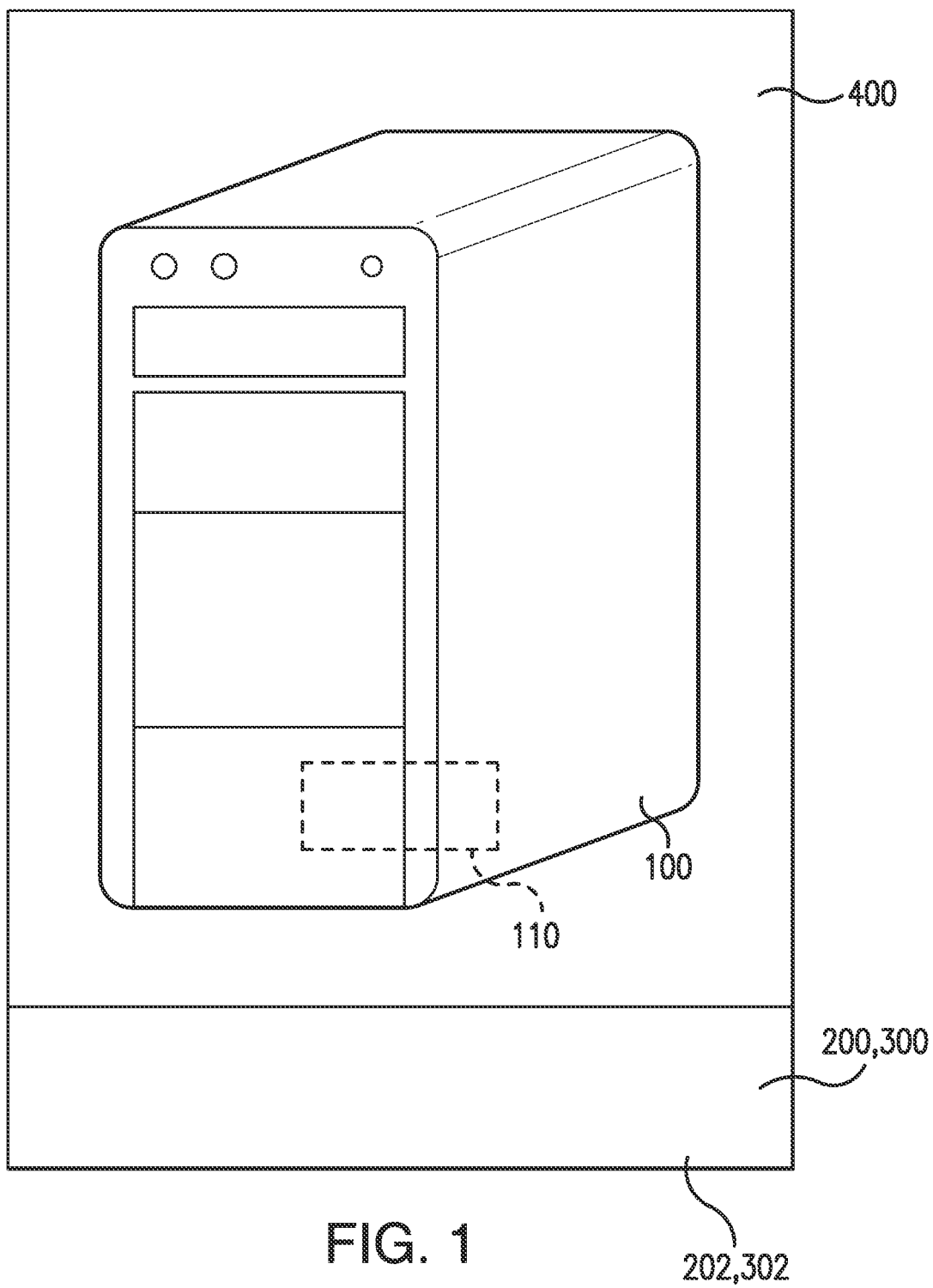
FIG. 1 shows a front view of a levitation system according to some embodiments.

FIG. 1 illustrates a levitation system according to some embodiments of the present invention. The levitation system includes an item 100 levitated by a levitator 200, 300. Levitator 200, 300 includes a housing 202, 302 containing components of levitator 200, 300. The levitation system of FIG. 1 also includes an enclosure 400 surrounding the levitated item 100.

Figure 12:
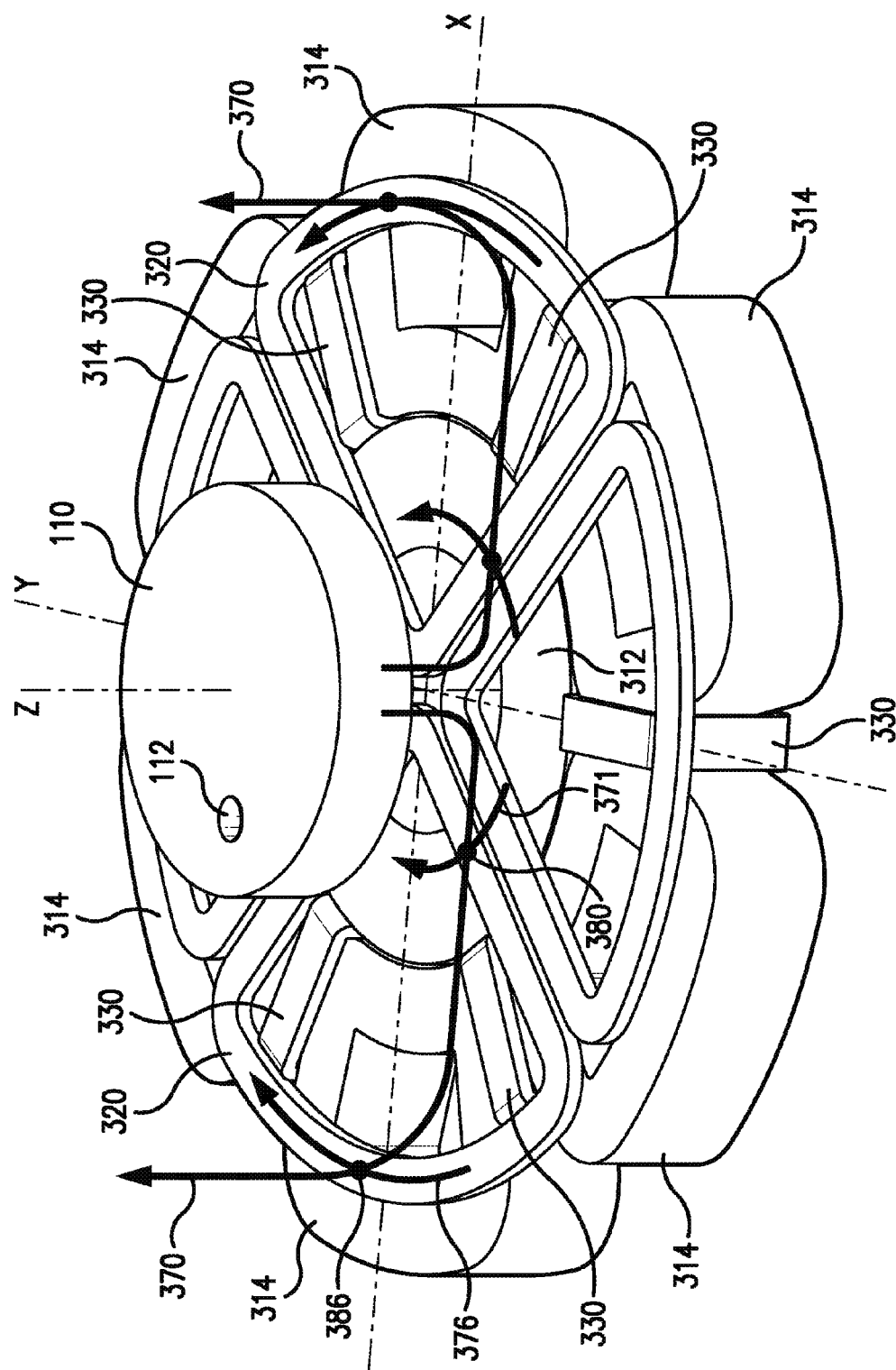
FIG. 12 shows a perspective view of a levitation system according to some embodiments.
Figure 13:
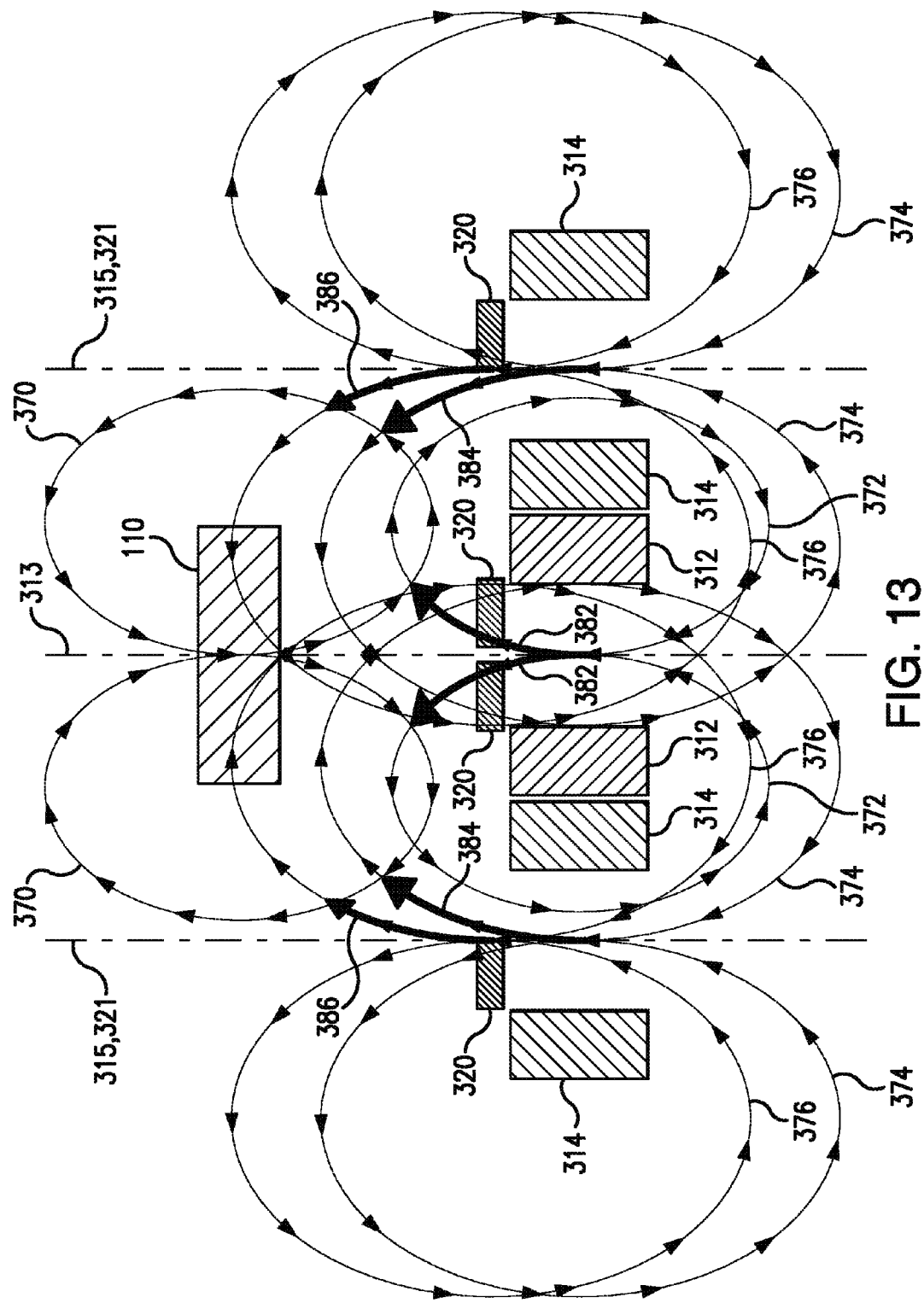
FIG. 13 shows a schematic side view of a levitation system according to some embodiments.
Figure 14:
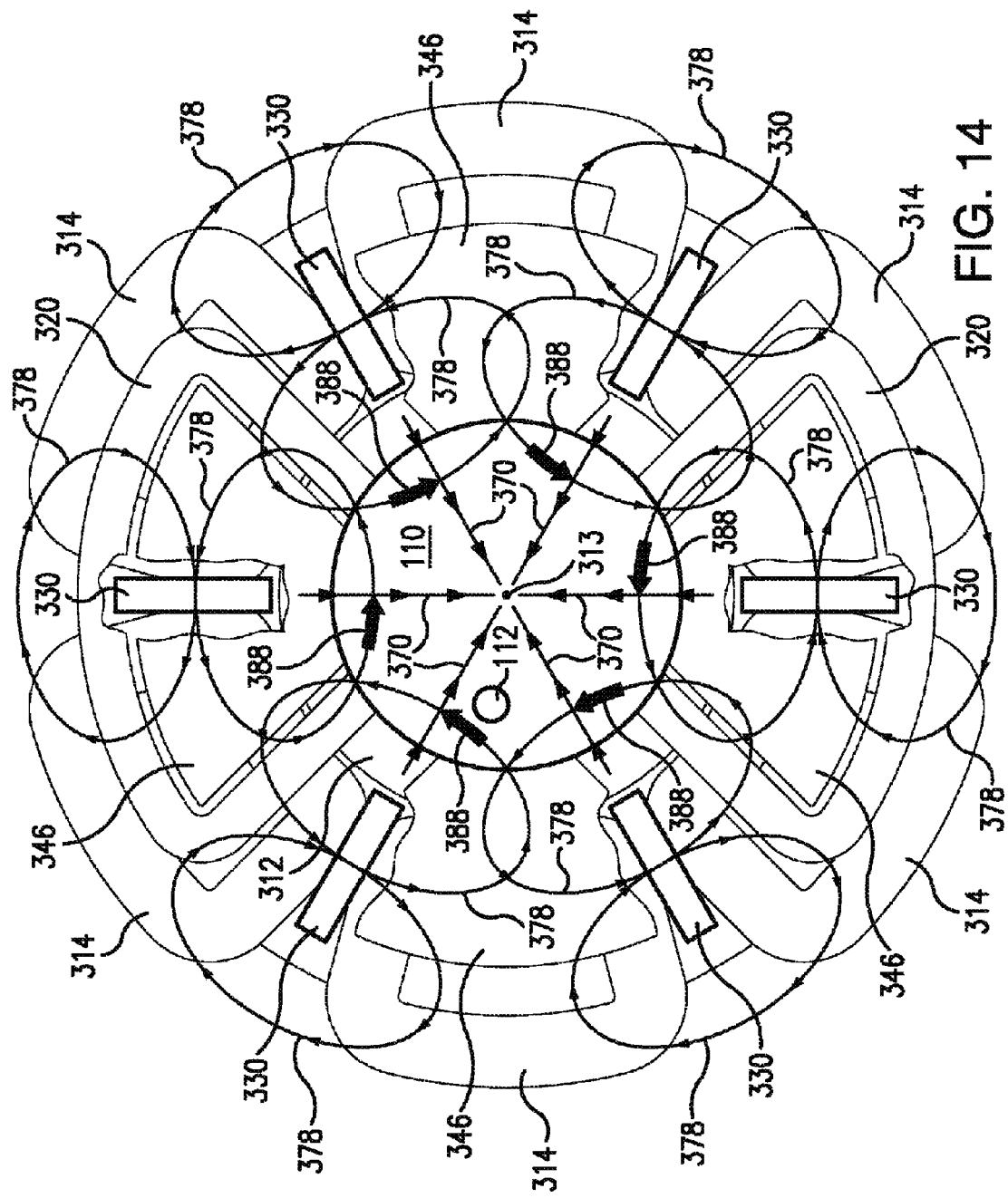
FIG. 14 shows a top view of a levitation system according to some embodiments.

Levitator 200, 300 may emit a magnetic field (e.g., magnetic fields 372, 374, 376, and/or 378 (see, e.g., FIGS. 12-14). Item 100 may be a magnetic-field-producing item that also emit a magnetic field (e.g., magnetic field 370 emitted by item magnet 110 that forms a part of or is otherwise fixed to item 100). These magnetic fields may be generated by anything capable of generating a magnetic field, whether permanent or temporary (e.g., a permanent magnet or an electromagnetic coil such as a wire coil that produces a magnetic field when energized (i.e., when an electric current is passed through it)). In some embodiments, item magnet 110 is a permanent magnet. The magnetic field of levitator 200, 300 may be oriented in opposition to the magnetic field of item 100, thereby inducing a repulsive magnetic force between item 100 and levitator 200, 300. When item 100 is positioned above levitator 200, 300, this repulsive force may overcome gravitational force to levitate item 100 above levitator 200, 300, as shown in FIG. 1. Levitators 200, 300 described herein may be high-powered levitators, capable of levitating heavy items at great distances. For example, overall power consumption of levitator 200, 300 may be 15-25 kilowatts (kW) (e.g., 20 kW), and levitator 200, 300 may be capable of levitating a 4-5 kilogram item at a height above 50 millimeters at this power consumption.

Enclosure 400 may inhibit interference with levitated item 100. Enclosure 400 may be made of a clear material (e.g., acrylic), so that item 100 can be viewed through it. In some embodiments enclosure 400 is not used.

FIGS. 2-5 illustrate a levitation system according to some embodiments of the present invention, including item 100 levitated by levitator 200. Levitator 200 is shown in cross-section in FIG. 2, and may include one or more repulsion magnets 210, which may be permanent magnets. Levitator 200 may also include one or more position control magnets 220, which may be electromagnetic coils. Together, permanent repulsion magnets 210 and electromagnetic position control coils 220 generate magnetic fields that act against a magnetic field of item 100 (which may include an item magnet 110 generating item 100's magnetic field), to induce magnetic forces that levitate item 100 above levitator 200.

Figure 6:
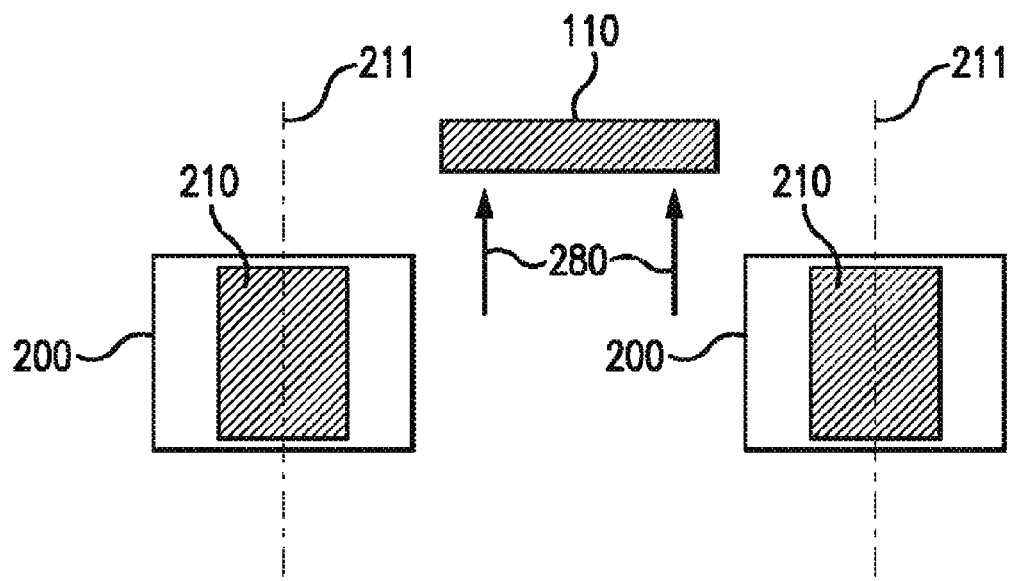
FIG. 6 shows a schematic side view of a levitation system according to some embodiments.

In some embodiments, magnetic axes 211 of permanent repulsion magnets 210 are oriented closer to vertical than horizontal (e.g., vertically as shown in FIGS. 2-5) and permanent repulsion magnets 210 are disposed spaced apart around a center of levitator 200. In some embodiments, magnetic axes 221 of electromagnetic position control coils 220 are oriented closer to horizontal than vertical (e.g., horizontally as shown in FIGS. 2-5) and electromagnetic position control coils 220 are disposed spaced apart around the center of levitator 200. Permanent repulsion magnets 210 may provide most of the vertical force levitating item 100. Vertical component force 282 provided by permanent repulsion magnets 210 is shown schematically in FIG. 6. And since permanent repulsion magnets 210 are disposed intermittently about and spaced apart from a center of levitator 200, the force induced by a first permanent repulsion magnet 210 tends to push item 100 toward the center of levitator (or away from it, depending on the polar orientation of permanent repulsion magnets 210), where it is counteracted by the force induced by one or more second permanent repulsion magnets 210 disposed on the other side of levitator 200 from the first (e.g., disposed opposite the first about the center of levitator 200). These opposing forces tend to keep item 100 positioned centrally above levitator 200.

Figure 7:
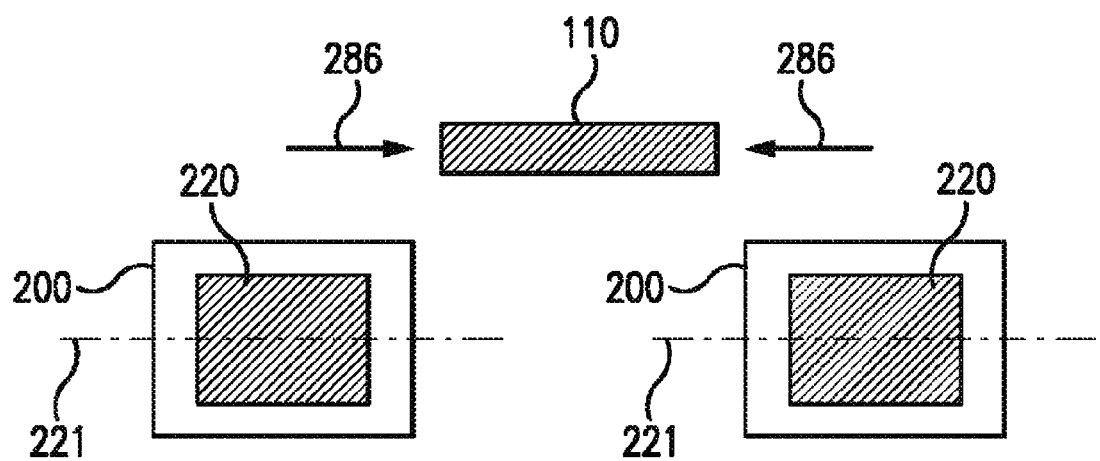
FIG. 7 shows a schematic side view of a levitation system according to some embodiments.

Levitator 200 may also control the lateral position or movement of item 100 above levitator 200. This control may be used to, for example, augment permanent magnets 210 in keeping item 100 centrally positioned, help return item 100 to a desired position after it has been moved (e.g., by an outside force), move item 100 above levitator 200 (e.g., to a different static position, or in a continuous dynamic pattern). Such control may be effected by electromagnetic position control coils 220. As shown, for example, in FIG. 3, electromagnetic position control coils 220 are arranged horizontally in levitator 200. By controlling current direction through electromagnetic position control coils 220, the polarity of the generated magnetic field can be set or reversed. For example, all electromagnetic position control coils 220 may be operated to have the same magnetic poles oriented inward, so they are all inducing the same lateral force direction on levitated item 100 (e.g., repulsive force tending to push item 100 toward levitator 200's center, or attractive force tending to pull item 100 away from levitator 200's center). Whether all attracting or all repelling, forces from all electromagnetic position control coils 220 can be tuned to be relatively equal, thereby cancelling each other out and helping to keep item 100 stationary above the center of levitator 200. Horizontal component force 286 provided by electromagnetic position control coils 220 is shown schematically in FIG. 7.

Electromagnetic position control coils 220 may also be used to move item 100 (e.g., laterally above levitator 200). For example, one or more first electromagnetic position control coils 220 may be driven with more current than the other, second electromagnetic position control coils 220, causing a greater repelling (or attracting) force to be induced from those first electromagnetic position control coils 220. This will cause item 100 to move away from (or toward) first electromagnetic position control coils 220. Current through electromagnetic position control coils 220 can be varied selectively throughout all electromagnetic position control coils 220 to achieve any desired movement of item 100 above levitator 200 (including, e.g., restorative movement to move item 100 back to a predetermined position when it has been moved out of it, or dynamic patterned movement following real-time or predetermined patterns).

Figure 2:
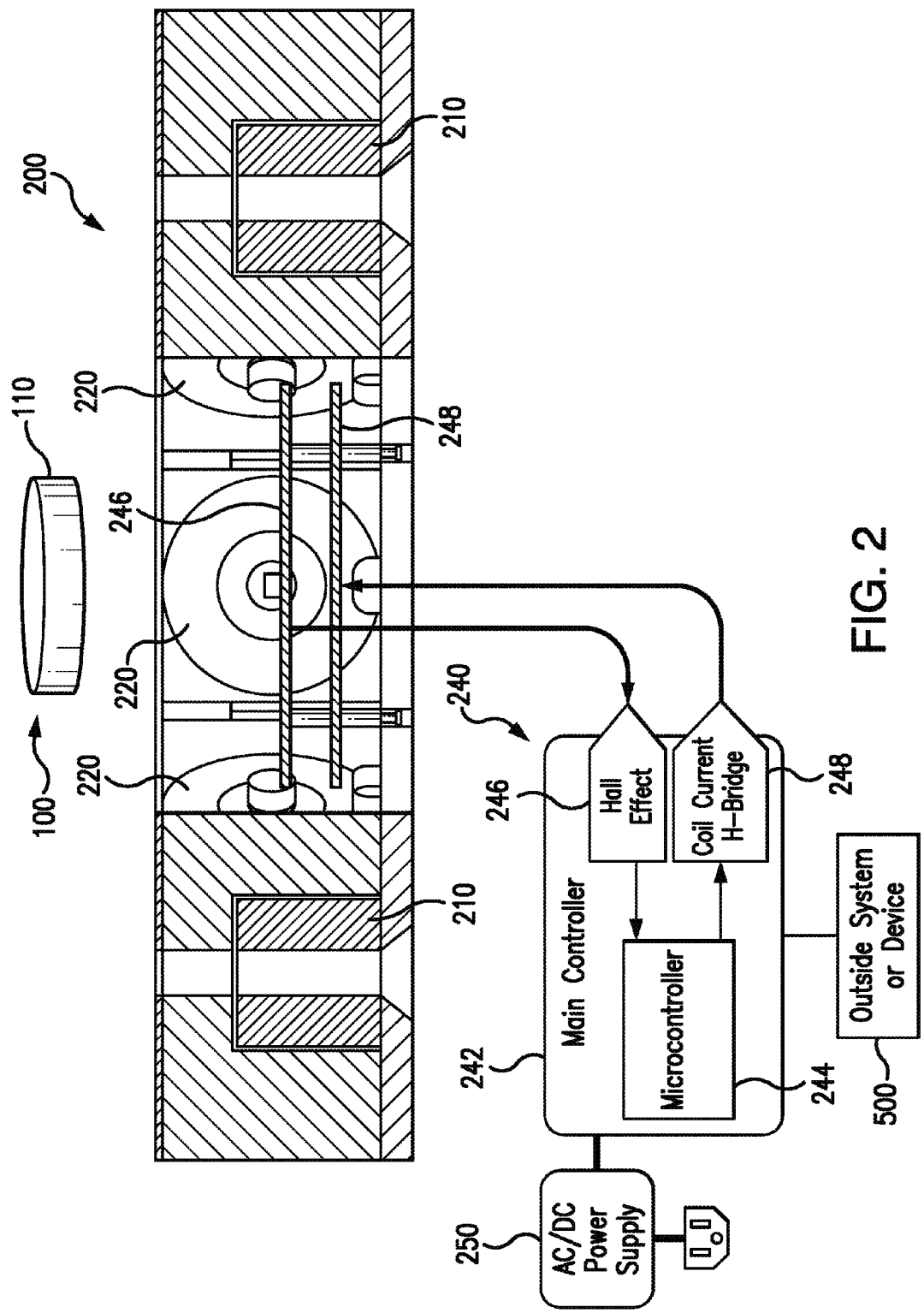
FIG. 2 shows a partial cross-sectional view of a levitation system according to some embodiments, taken along line 5-5' of FIG. 4.
Figure 3:
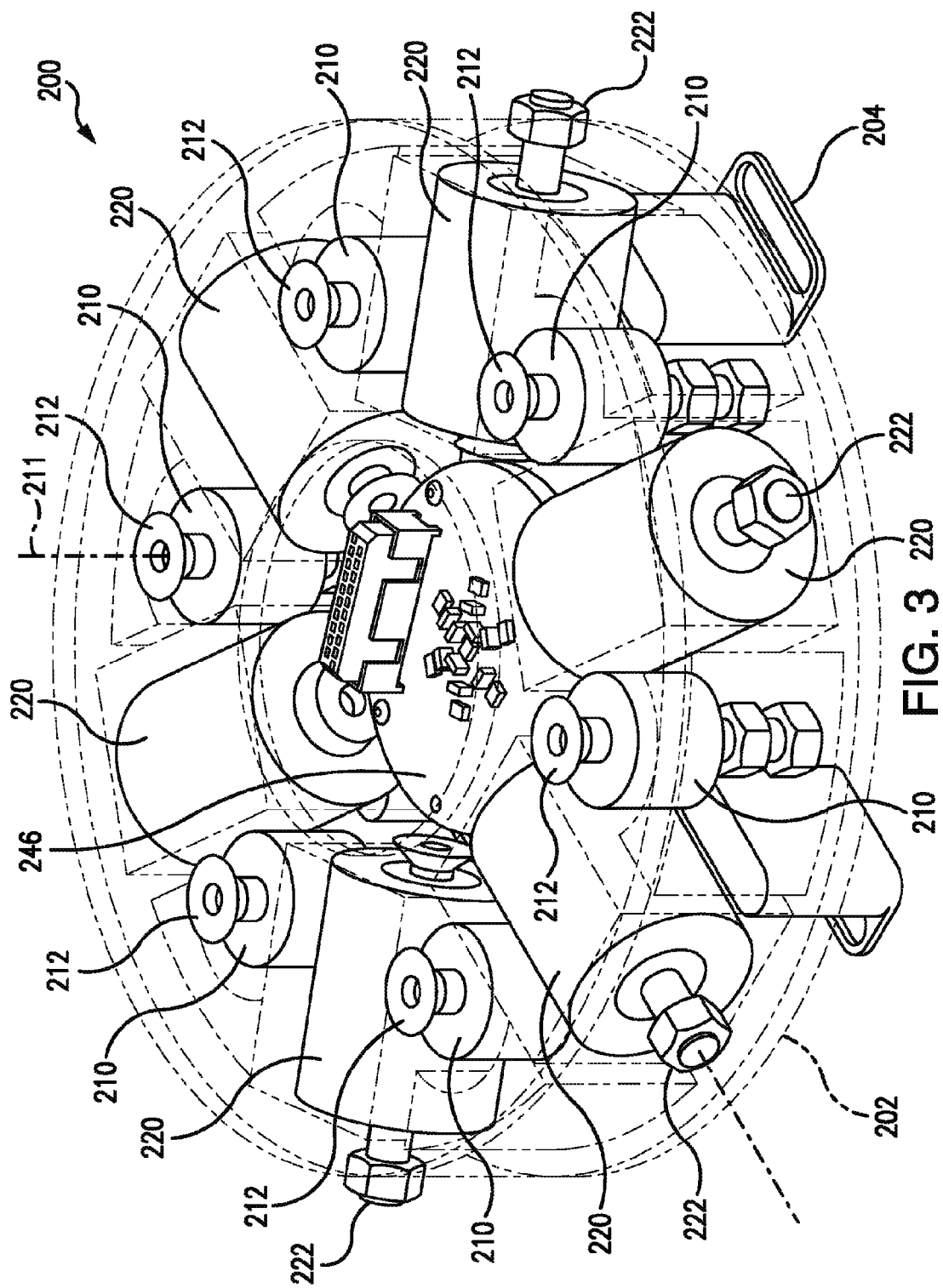
FIG. 3 shows a perspective view of a levitator according to some embodiments, with a housing thereof shown in phantom.
Figure 4:
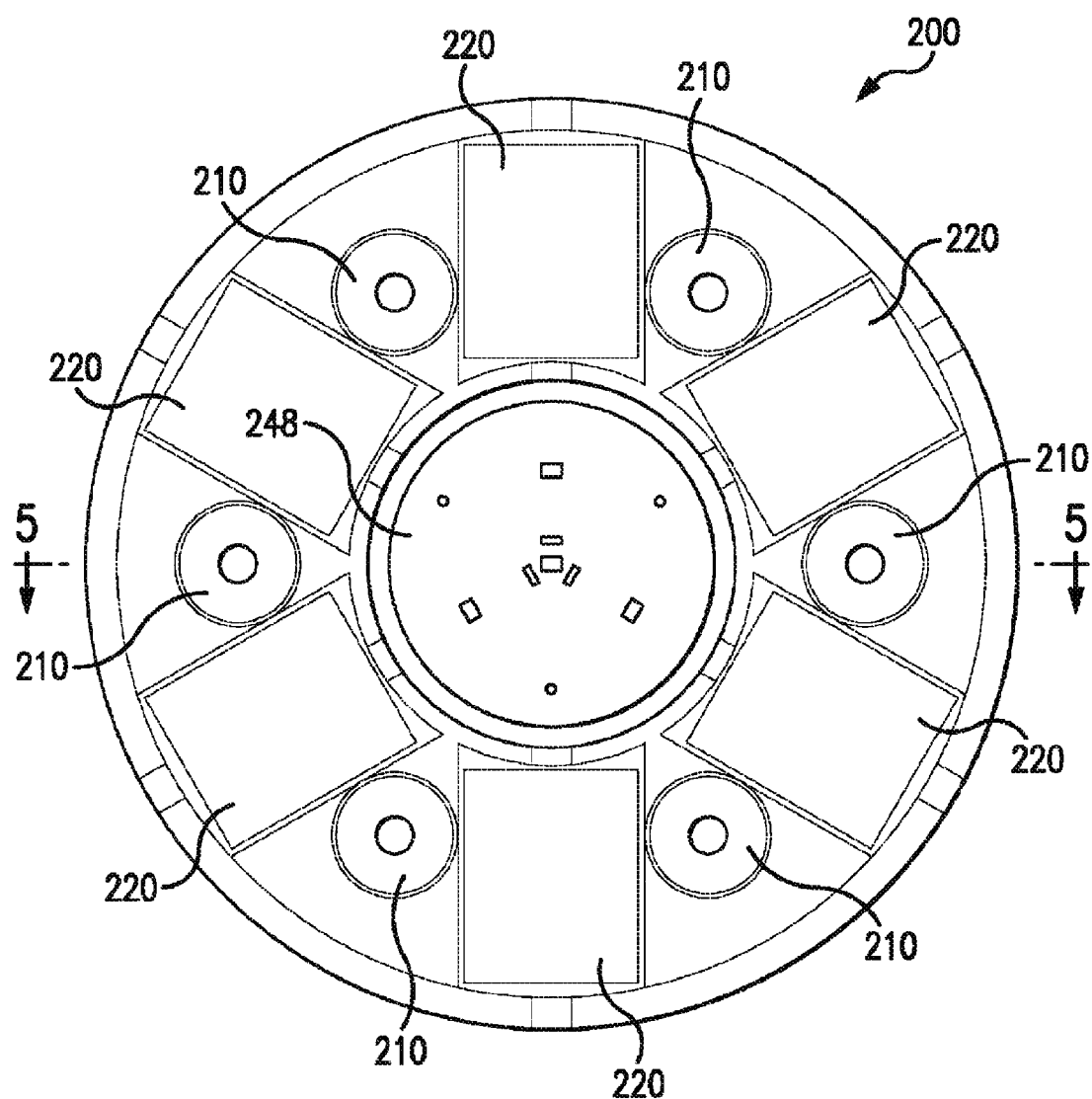
FIG. 4 shows a bottom view of a levitator according to some embodiments.
Figure 5:
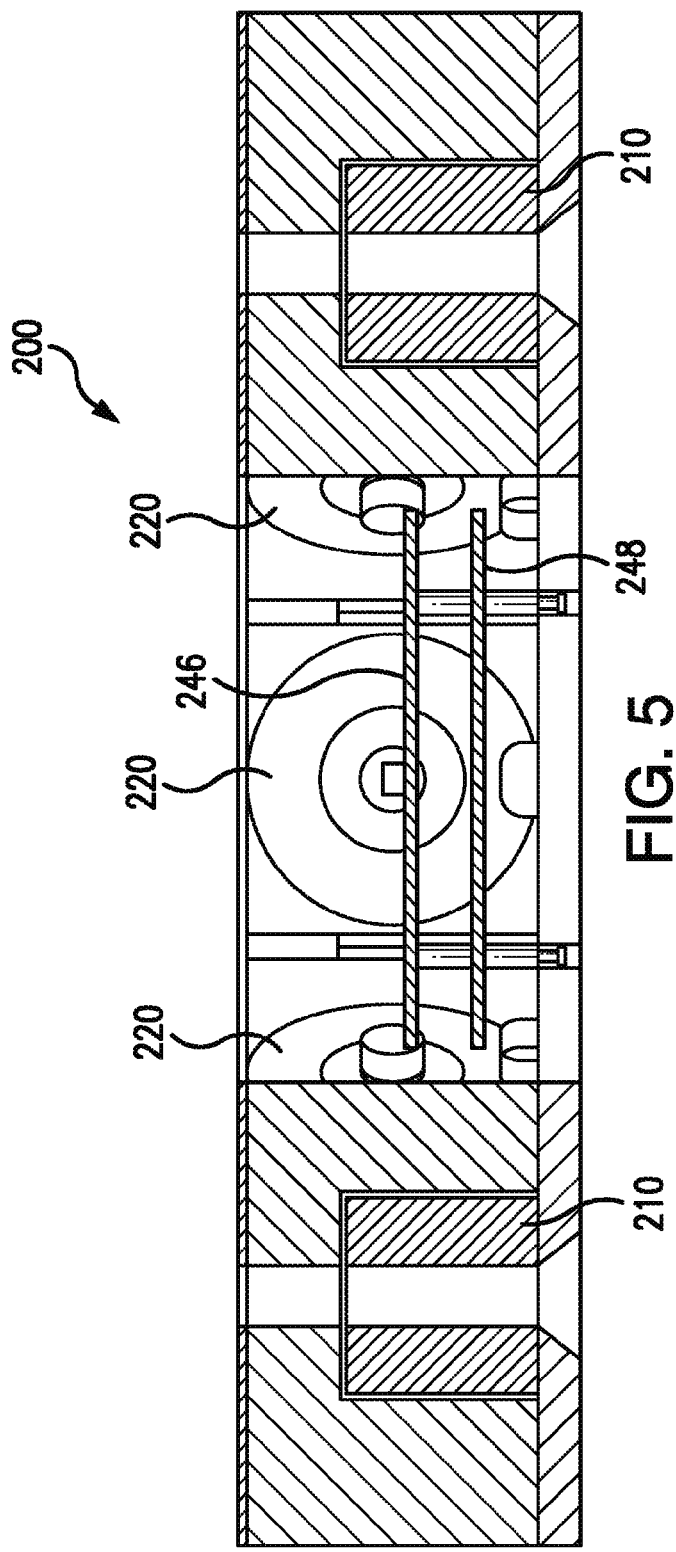
FIG. 5 shows a cross-sectional view of a levitator according to some embodiments, taken along line 5-5' of FIG. 4.

Current through electromagnetic position control coils 220 may be controlled by a control system 240, which may be a part of levitator 200. Control system 240 may include a main controller 242, which may include a sub-controller 244, a position sensor 246, and a coil circuit 248. Position sensor 246 may be positioned within levitator 200 below an area in which item 100 is intended to levitate. For example, as shown in FIGS. 2 and 3, position sensor 246 is positioned centrally within levitator 200. Position sensor 246 can sense the position of levitated item 100 relative to levitator 200, and can send a signal representing that position to sub-controller 244 (which may be, for example, a microcontroller). Position sensor 246 may be, for example, a magnetic-field sensor, such as a Hall-effect sensor, that has a variable output based on the strength of an incident magnetic field. In some embodiments, position sensor 246 may include one or more such sensors arranged in an array on one or more printed circuit boards.

Based on the position signal(s) from position sensor 246, coil circuit 248 can send or adjust the amount and/or direction of current through each electromagnetic position control coil 220 to adjust the position of item 100 as described above. Control system 240 thus creates a feedback loop where the position of item 100 is monitored and adjusted as needed to maintain a desired static position or dynamic movement of item 100.

In some embodiments, levitator 200 includes mounting brackets 204 to affix it to a surface (see FIG. 3). In some embodiments permanent repulsion magnets 210 are mounted on magnet mounts 212, and electromagnetic position control coils 220 are mounted on coil mounts 222. Magnet mounts 212 and/or coil mounts 222 may be, for example, bolts, screws, or glue). In some embodiments magnet mounts 212 and/or coil mounts 220 are adjustable, in order to move the position of permanent repulsion magnets 210 to adjust their effect on levitated item 100. For example, where magnet mounts 212 and/or coil mounts 220 are screws, bolts, or other threaded fasteners, turning them in one direction or the other may raise or lower permanent repulsion magnets 210.

FIGS. 8-11 illustrate a levitation system according to some embodiments of the present invention, including item 100 levitated by levitator 300. Levitator 300 may include one or more electromagnetic repulsion coils 310, one or more electromagnetic position control coils 320, and one or more electromagnetic rotation control coils 330. Coils 310, 320, and 330 may be formed of wire wrapped together in a coiled configuration. Coils 310, 320, and 330 may be contained within a housing 302 of levitator 300 (see FIG. 1; housing 302 is omitted from other views for clarity of depiction). Together, these three coil types can be controlled to control or influence the position and movement of levitated item 100 in 6 degrees of freedom. To control the effect of its coils, levitator 300 in some embodiments includes a control system 340. Control system 340 may control the amount and direction of electrical current through each of coils 310, 320, 330, thereby controlling the position and/or motion of levitated item 100. This control can constrain motion of item 100 to keep it to a static position, or to dynamically move it (e.g., back to a static position, or consistently with a desired dynamic motion).

Electromagnetic repulsion coils 310 may in some embodiments include a central repulsion coil 312 and peripheral repulsion coils 314 disposed radially around central repulsion coil 312 at equal intervals, as shown. For example, in some embodiments levitator 300 may include a single central repulsion coil 310 and six peripheral repulsion coils 314. In some embodiments the wire used to form electromagnetic coils 310 is copper wire. In some embodiments the wire used to form electromagnetic coils 310 is rectangular wire, to help maximize wire packing efficiency in forming electromagnetic repulsion coils 310 (wire with rectangular cross-section can be wrapped into a coil without space between adjacent turns of the wire), though other forms (e.g., circular) may be used to achieve similar results. In some embodiments the wire used to form electromagnetic coils 310 is electrically insulated with an insulative coating. The insulative coating may be thermally conductive and thermally stable such that it will not break down at high operating temperatures. The insulative coating may be, for example, a bondable thermoplastic film (e.g., polyester amide bindable insulation, or polyurethane-based insulation). The bondable film will bond to the insulative coating on adjacent turns of wire in electromagnetic repulsion coils 310, thereby helping the coil maintain its form, and support itself.

Figure 9:
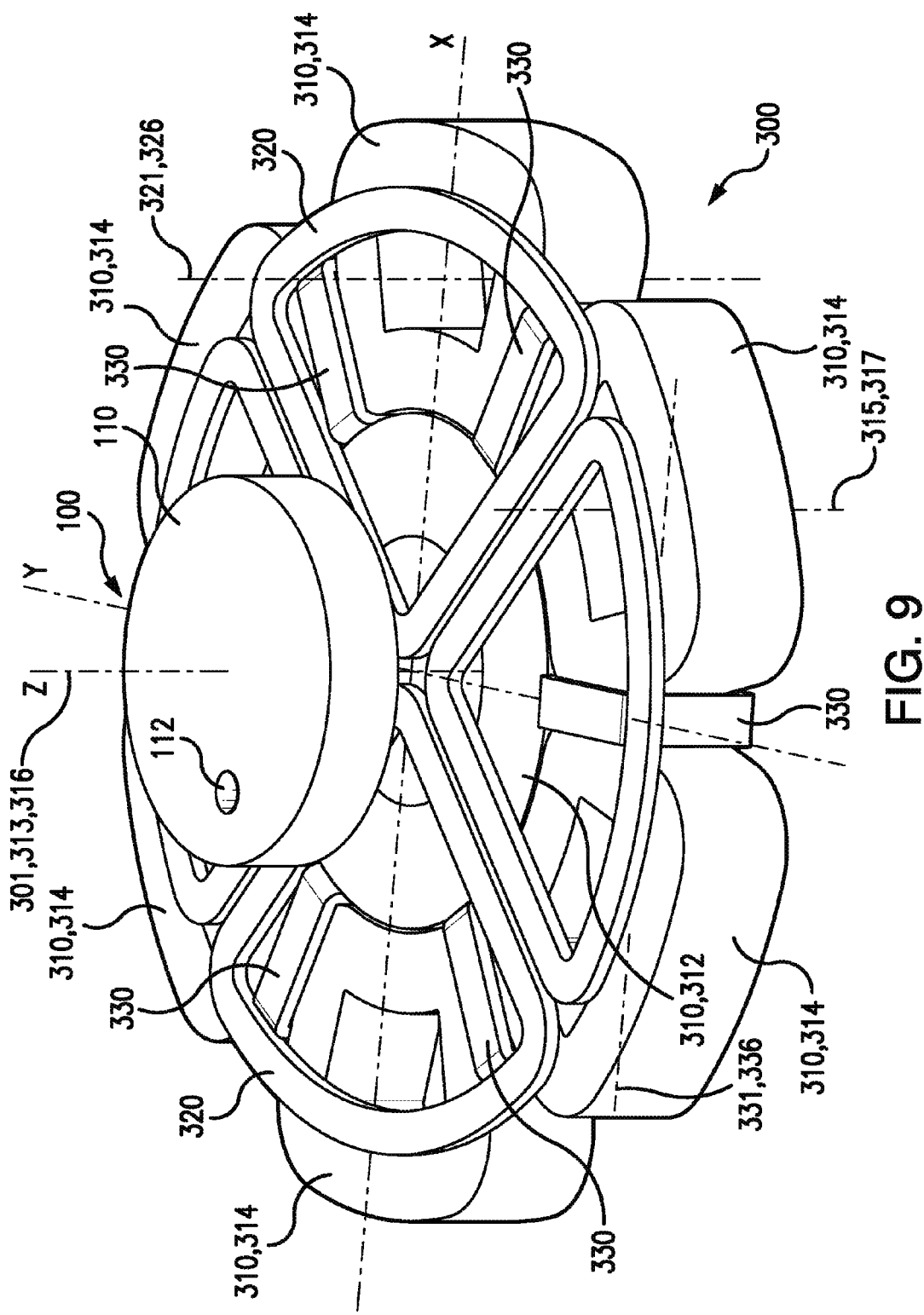
FIG. 9 shows a perspective view of a levitation system according to some embodiments.

Magnetic axis 313 of central repulsion coil 312 may coincide with a vertical center axis (or z-axis, see FIG. 9) of levitator 300. Magnetic axes 315 of peripheral repulsion coils 314 may be oriented closer to vertical than horizontal (e.g., parallel to magnetic axis 313 and the z-axis as shown in FIG. 9). In some embodiments, magnetic axis 313 and magnetic axes 315 are all parallel to each other. In some embodiments, central repulsion coil 312 has a circular coil shape, as shown, but it may be other shapes, for example, an oval or square. In some embodiments, peripheral repulsion coils 314 have a coil shape defined by a longer outer arc and a shorter inner arc connected by two side segments, as shown. This may help peripheral repulsion coils 314 to seat closely around a portion of central repulsion coil 312 (e.g., so that a portion of central repulsion coil 312 is within the shorter inner arcs of peripheral repulsion coils 314) while still maintaining a roughly circular arrangement of levitator 300 (e.g., by the longer outer arcs being in circular alignment centered on magnetic axis 313 of central repulsion coil 312). But peripheral repulsion coils 314 need not have the shape shown; they could, for example, be circular or square. Central repulsion coil 312 may have a central repulsion coil axis 316, and peripheral repulsion coils 314 may have peripheral repulsion coil axes 317. Coil axes 316 and 317 may coincide with magnetic axes 313 and 315, respectively, and/or may have the same positioning as magnetic axes 313 and 315 as described above.

Electromagnetic position control coils 320 may in some embodiments include multiple electromagnetic position control coils 320 positioned radially around the center of levitator 300 at equal intervals, as shown (e.g., around magnetic axis 313 of central repulsion coil 312, of the z-axis as shown in FIG. 9). For example, levitator 300 may include four electromagnetic position control coils 320, as shown, for example, in FIGS. 8 and 10. Each electromagnetic position control coil 320 may be positioned opposite another electromagnetic position control coil 320 about a central vertical axis 301 of levitator 300. Electromagnetic position control coils 320 may be formed from wire (including insulation) having the same or similar properties as described above for electromagnetic repulsion coils 310.

Magnetic axes 321 of electromagnetic position control coils 320 may be oriented closer to vertical than horizontal (e.g., parallel to magnetic axis 313 and the z-axis as shown in FIG. 9). In some embodiments, magnetic axes 321 are all parallel to each other. In some embodiments, magnetic axes 321 are all parallel to magnetic axes 313 and 315. In some embodiments, electromagnetic position control coils 320 have a wedge coil shape, defined by an outer arc and two side segments extending from ends of the outer arc and meeting at an inner apex, as shown. This may help electromagnetic position control coils 320 fit closely together and together overlay and enclose a substantial portion (e.g., greater than 50%) of the area occupied and enclosed by electromagnetic repulsion coils 310. But electromagnetic position control coils 320 need not have the shape shown; they could, for example, be circular or square. Electromagnetic position control coils 320 may have position control coil axes 326. Coil axes 326 may coincide with magnetic axes 321 and/or may have the same positioning as magnetic axes 321 as described above.

Electromagnetic rotation control coils 330 may in some embodiments include multiple electromagnetic rotation control coils 330 positioned radially around the center of levitator 300 at equal intervals, as shown (e.g., around magnetic axis 313 of central repulsion coil 312, of the z-axis as shown in FIG. 9). For example, levitator 300 may include six electromagnetic rotation control coils 330, as shown, for example, in FIGS. 9 and 11. Electromagnetic rotation control coils 330 may be formed from wire (including insulation) having the same or similar properties as described above for electromagnetic repulsion coils 310.

Magnetic axes 331 of electromagnetic rotation control coils 330 may be oriented closer to horizontal than vertical (e.g., perpendicular to magnetic axis 313 and the z-axis as shown in FIG. 9; parallel to the x-y plane). In some embodiments, magnetic axes 331 are all perpendicular to at least one of magnetic axes 313, 315, and 321. In some embodiments, electromagnetic rotation control coils 330 have a rectangular shape, defined by four major straight lengths connected at right angles, as shown. This may help electromagnetic rotation control coils fit in between adjacent peripheral repulsion coils 314: they can wrap around the most portions of adjacent peripheral repulsion coils 314 that are most proximate to each other while keeping close to peripheral repulsion coils 314, as shown. But electromagnetic rotation control coils need not have the shape shown; they could, for example, be circular or triangular. Electromagnetic rotation control coils 330 may have rotation control coil axes 336. Coil axes 336 may coincide with magnetic axes 331 and/or may have the same positioning as magnetic axes 331 as described above.

FIGS. 12-14 illustrate magnetic fields and forces generated and induced by electromagnetic coils 310, 320, and 330, and by item magnet 110. Electromagnetic repulsion coils 310 may provide most of the vertical force levitating item 100, thereby controlling and having the greatest influence over item magnet 110's (and thereby item 100's) position and movement in the vertical direction (i.e., along the z-axis). Electromagnetic position control coils 320 may provide most of the horizontal radial force (i.e., force directed toward and away from central vertical axis 301 of levitator 300), thereby controlling item 100's position and movement in the horizontal plane (i.e., within the x-y plane). Electromagnetic rotation control coils 330 may provide most of the tangential force (i.e., force directed about central vertical axis 301 of levitator 300), thereby controlling item 100's orientation about central vertical axis 301 of levitator 300.

Together, coils 310, 320, and 330 can also control the pitch, or tilt, of item 100 (e.g., while held at a static orientation by electromagnetic rotation control coils 330, peripheral repulsion coils 314 on a first side of levitator 300 may be run at a higher current than peripheral repulsion coils 314 on a second, opposite, side of levitator 300, thereby inducing greater force on item 100 above the first side, causing that side of item 100 to raise higher, tilting item 100. Electromagnetic position control coils 320 can be run at appropriate currents to maintain item 100 in the intended horizontal position above levitator 300.

Of course, due to the nature of magnetic fields, magnetic fields from any of the described coils may contribute some amount of induced force in directions other than those described, but the effects of all of the coil contributions can be coordinated together to achieve the desired position and/or motion of item 100 through control system 340, described further below. For example, consider that a force induced by electromagnetic position coils is 80% horizontal radial force and 20% vertical levitating force. That 20% vertical levitating force may help lighten the load that electromagnetic repulsion coils 310 must carry in order to keep item 100 levitated at a desired height, and so electromagnetic repulsion coils 310 may be run at a lower current than would otherwise be needed to maintain that height.

FIG. 12 illustrates magnetic fields and forces induced by electromagnetic repulsion coils 310 and electromagnetic position control coils 320 according to some embodiments. In the exemplary embodiment shown in FIG. 12, item magnet 110's magnetic field is represented by arrows 370, electromagnetic repulsion coils 310's magnetic field is represented by arrow 371, and electromagnetic position control coils 320's magnetic field is represented by arrow 376. Where the fields cross, force is induced. A repulsion force is induced at 380, and a position control force is induced at 386. Since repulsion coil field 371 crosses item magnet field 370 closer to the center of levitator 300 and item magnet 110, it crosses at an angle with a significant vertical component, thereby inducing a vertical force (e.g., repulsion force 380). This may provide the majority of the force used to levitate item 100, as described above. Since position control coil field 376 crosses item magnet field 370 farther from the center of levitator 300 and item magnet 110, it crosses at an angle with a significant horizontal component, thereby inducing a horizontal force (e.g., position control force 386). This may provide the majority of the force used to control the horizontal position of item 100, as described above.

FIG. 13 represents a single vertical plane of levitator 300 to illustrate schematically some of the magnetic fields and forces induced by electromagnetic repulsion coils 310 and electromagnetic position coils 320 according to some embodiments. Hatching in FIG. 13 is different for different elements, and does not necessarily indicate different materials. Only a few field lines and forces are illustrated, for exemplary and instructive purposes. One of skill in the art would recognize that the actual magnetic fields generated would be more dense and could take on many different positions and shapes depending on system variables such as character of the coils (e.g., gauge, length, number and arrangement of turns, and coil direction) or item magnet, as well as the magnitude and direction of current running through the coils.

Further, the size ratio between the electromagnetic coils (individually or collectively—e.g., repulsion coils 310) and item magnet 110 influences the degree of lift and control attributable or attainable from each coil, since the direction of electromagnetic coil electric fields (e.g., repulsion coil fields 371, position control coil fields 374, and rotation control coil fields 378 of electromagnetic repulsion coils 310, electromagnetic position control coils 320, and electromagnetic rotation control coils 330) incident on item magnet field 370 of item magnet 110 depend on the size, shape, and positioning of the electromagnetic coils relative to the size, shape, and positioning of item magnet 110.

As shown, central repulsion coil 312 and peripheral repulsion coils 314 are operated to have a first magnetic polarity, oriented in opposition to the second magnetic polarity of levitated item 100. This opposition in magnetic polarity provides the magnetic opposition that helps induce the repulsive magnetic forces used to levitate and control the height of levitation of item 100. As also shown, electromagnetic position control coils 320 are also operated to have the first magnetic polarity. In this operative orientation they can contribute to levitating and controlling the height of levitation of item 100, and can control the horizontal position and motion of item 100 by providing a lateral repulsive force upon item 100. The operative orientation of electromagnetic position control coils 320 or subsets thereof can be reversed, however, to control the position (including orientation) of item 100 using attractive forces, or a combination of repulsive and attractive forces.

Item magnet 110 generates item magnet field 370. Central repulsion coil 312 generates central repulsion coil field 372 when energized with current, which interacts with item magnet field 370 to induce central repulsion forces 382 between the two fields. As shown, central repulsion forces 382 have vertical components, which may provide and/or contribute to levitation of item 100 (which includes item magnet 110) by overcoming gravitational force acting on item 100. Magnetic fields and forces discussed herein are shown along a few particular lines for clarity of depiction. One of skill in the art would understand that the magnetic fields and forces described radiate infinitely in expanding circles from their origins, and that the strongest forces induced occur where fields intersect at 90-degree angles.

Peripheral repulsion coils 314 generate peripheral repulsion coil fields 374 when energized with current, which interact with item magnet field 370 to induce peripheral repulsion forces 384 between item magnet field 370 and peripheral repulsion coil fields 374. As shown, peripheral repulsion forces 384 have vertical components, which may provide and/or contribute to levitation of item 100 by overcoming gravitational force acting on item 100. In some embodiments, central repulsion coil 312, peripheral repulsion coils 314, or both, may have a current density of 4-7 amps per square millimeter (A/mm$^2$) (e.g., 5.5-6 A/mm$^2$).

Central repulsion coil 312 and peripheral repulsion coils 314 may work together to levitate item 100 by the combined vertical magnitude of central repulsion forces 382 and peripheral repulsion forces 384. For example, central repulsion coil 312 (which may be formed of 12 AWG wire having a direct current resistance of 0.71) may be energized with current up to 18.3 amperes to produce a force of up to 52 Newtons on item magnet 110, and peripheral repulsion coils 314 (which may be formed of 12 AWG wire having a direct current resistance of 0.45) may be energized with current up to 18.3 amperes to each produce a force up to 3 Newtons on item magnet 110, for a total of 70 Newtons of upward force levitating item 110. (Peripheral repulsion coils 314 each contributes less force to item magnet 110 since they are farther from item magnet 110 when it is positioned centrally above levitator 300.) Of course, these values can change depending on the position of item magnet 110 and the amount of current provided to each coil by control system 340. In some embodiments, the capacity of the system to reach higher current and force values may be improved by its incorporation of a cooling system to draw generated heat from out of the system. The cooling system may use a substance other than air to effect such cooling (e.g., water or liquid nitrogen). This can allow system components to operate at higher current and force values without exceeding temperature thresholds.

Electromagnetic position control coil 320 generated position control coil field 376, which interacts with item magnet field 370 to induce position control forces 386 between the two fields. As shown, position control forces 386 have horizontal components acting on magnet field 370 from both sides, which may be used individually or in tandem to push and/or pull item 100 horizontally toward or away from the outer edges of levitator 300. Since position control coils 320 are wedge-shaped in this embodiment, their magnetic field axes 321 are positioned more toward their outer arcs than their inner apices. This can help position control coil field have more of a horizontal impact on item magnet field 370 by positioning the field's origin farther away from central magnetic axis 313, while maintaining a compact footprint for levitator 300.

As shown in FIG. 13, peripheral repulsion forces 384 can have a horizontal component acting on item magnet field 370. In some embodiments, in addition to their role in providing vertical repulsive force as described, peripheral repulsion coils 314 can provide position control of item 100 in the same manner as described for position control force 386, using the horizontal components of peripheral repulsion forces 384. In such embodiments, separate position control coils may be omitted. This may lead to a more compact or economical levitator 300. Embodiments including electromagnetic position control coils 320 may have increased control over movement and position of item 100 due to the independent control over peripheral repulsion coil field 374 and position control coil field 376 (and thus peripheral repulsion force 384 and position control force 386.

FIG. 14 represents a top view of levitator 300 to illustrate schematically some of the magnetic fields and forces induced by electromagnetic rotation control coils 330 according to some embodiments. Certain parts of levitator 300 are broken away for clarity, to make electromagnetic rotation control coils 330 more visible. Only a few field lines and forces are illustrated, for exemplary and instructive purposes. One of skill in the art would recognize that the actual magnetic fields generated would be more dense and could take on many different positions and shapes depending on system variables such as character of the coils (e.g., gauge, length, number and arrangement of turns, and coil direction) or item magnet, as well as the magnitude and direction of current running through the coils.

As shown, electromagnetic rotation control coils 330 are operated to have a first magnetic polarity oriented in the same direction around central vertical axis 301 of levitator 300 coincident with magnetic axis 313. In this operative orientation they all induce forces in the same angular direction—clockwise as viewed in FIG. 14—thereby causing or promoting rotation of item 100 (including item magnet 110) in the clockwise direction. The operative orientation of electromagnetic rotation control coils 330 or subsets thereof can be reversed, however, to induce forces in the opposite angular direction—counterclockwise as viewed in FIG. 14—thereby causing or promoting rotation of item 100 in the counterclockwise direction. In some cases, the operative orientation of only a subset of electromagnetic rotation control coils 330 may be reversed to run in the counterclockwise direction while others remain operating in the clockwise direction, thereby inducing angular forces in opposition to each other, which may be used to more precisely control the orientation of item 100, as described in more detail below with respect to control system 340.

As shown in FIG. 14, electromagnetic rotation control coils 330 generate rotation control coil fields 378, which interact with item magnet field 370 to induce rotation control forces 388 between item magnet field 370 and rotation control coil fields 378. As shown, Rotation control forces 388 have tangential components (to a circle about axis 313), or components that cross item magnet field 370 perpendicularly, which may provide and/or contribute to rotation of item 100 by counteracting or overcoming some or all forces in a contrary direction due to, for example, momentum, inertia, or friction.

As item magnet 110 is levitated, its position and orientation are monitored and controlled by a control system 340. Control system 340 may include a main controller 342, a controller 344, position sensor 346 and a coil circuit 348. In some embodiments one of main controller 324 and controller 344 may be omitted or both may be formed together in the same controller. In some embodiments one or both of main controller 324 and controller 344 may be a microcontroller.

Figure 10:
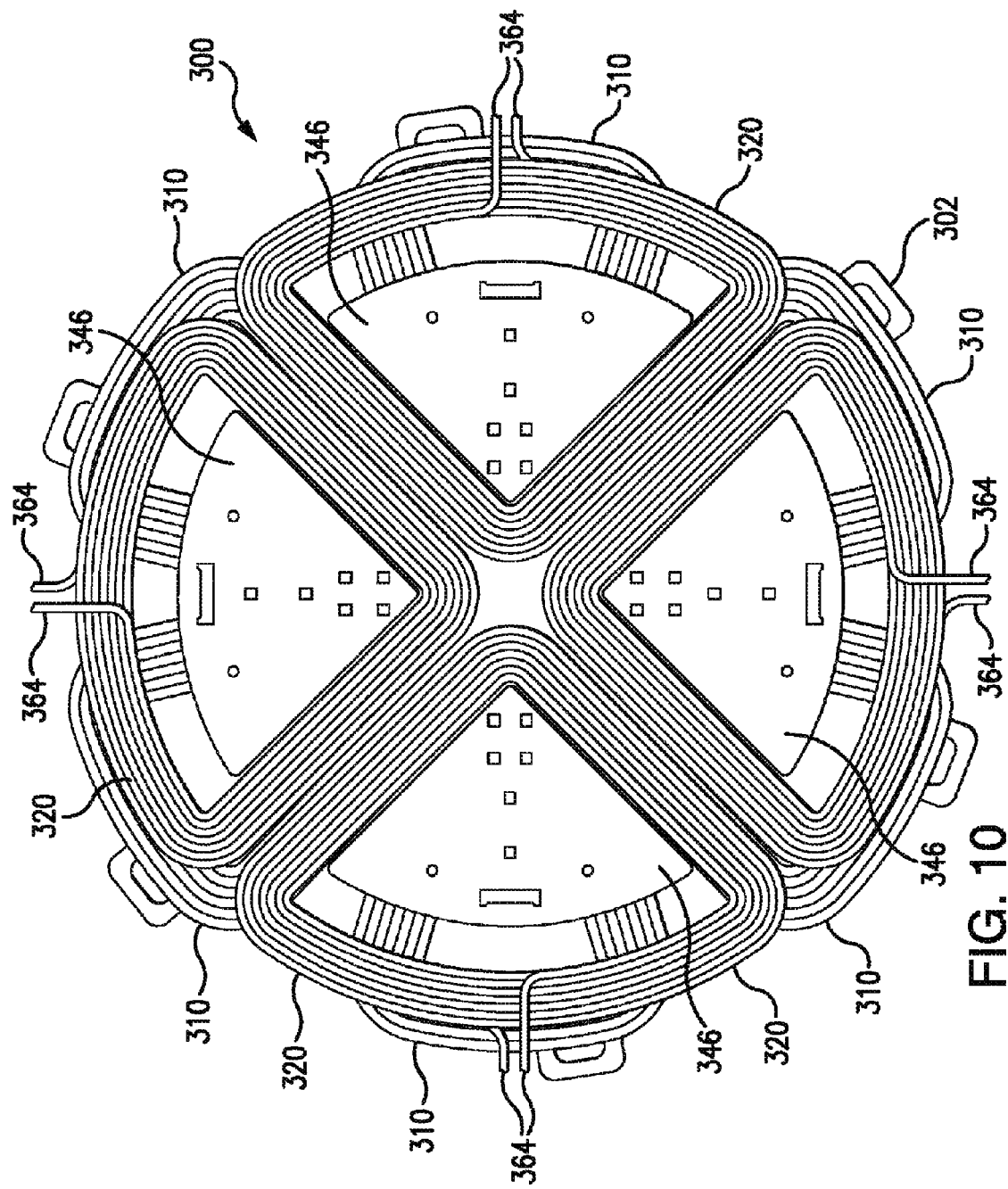
FIG. 10 shows a top view of a levitator according to some embodiments.
Figure 11:
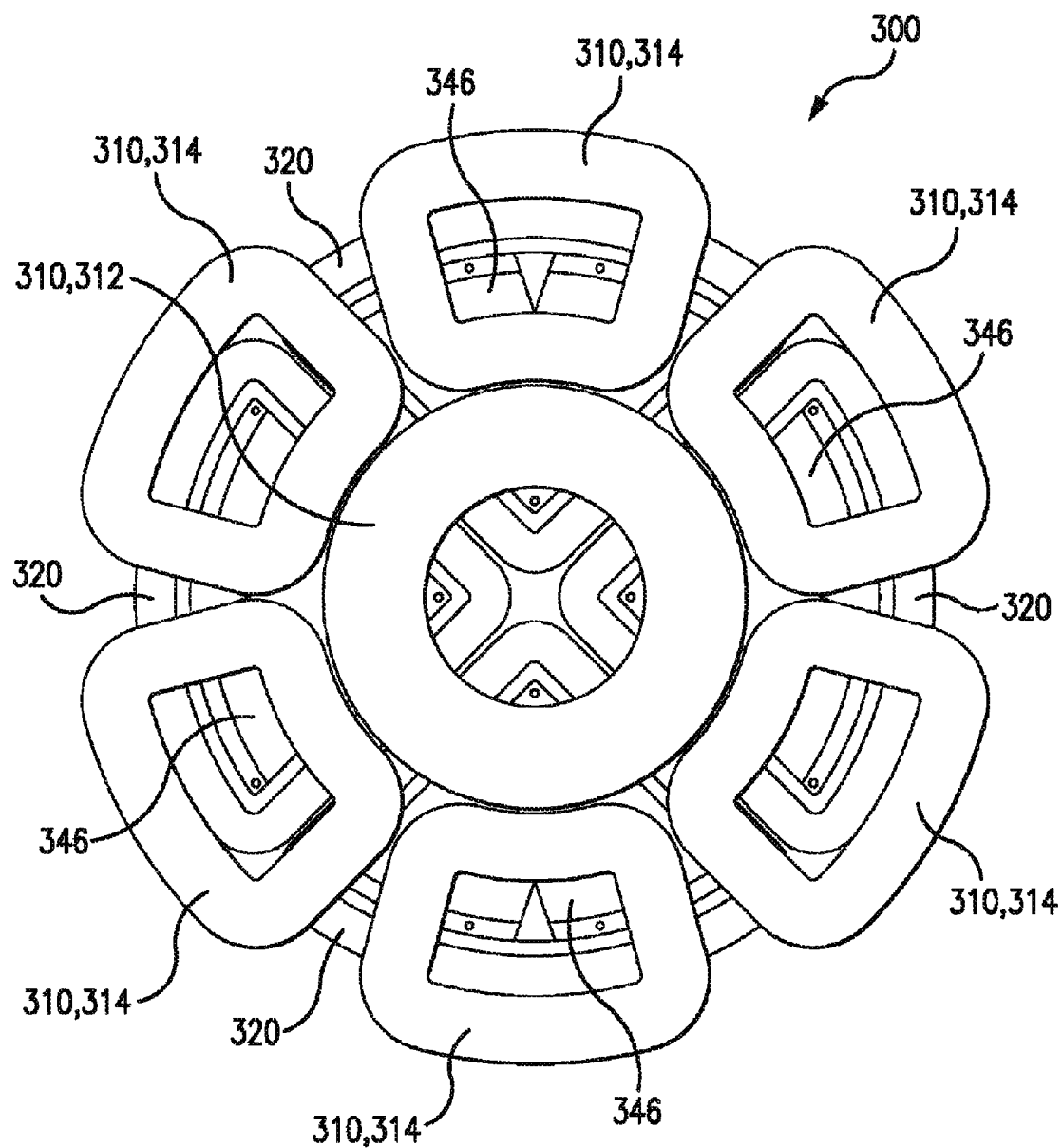
FIG. 11 shows a bottom view of a levitator according to some embodiments.

In some embodiments, as shown, for example, in FIGS. 9 and 10, control system 340 346 may include multiple separate position sensors 346 arranged about a center of levitator 300. Position sensors 346 can sense the position (including orientation) of levitated item 100 relative to levitator 300, and can send a signal representing that position to controller 344 (which may be, for example, a microcontroller). Position sensors 346 may be, for example, magnetic-field sensors, such as Hall-effect sensors, that have a variable output based on the strength of an incident magnetic field. In some embodiments, position sensors 346 may include one or more such sensors arranged in an array on one or more printed circuit boards. In some embodiments, position sensors 346 are arranged within electromagnetic position control coils 320 and above electromagnetic repulsion coils 310 and electromagnetic rotation control coils. In this arrangement, as shown, for example, in FIG. 8, no coil passes over a position sensor 346, thus minimizing potential interference therefrom. In some embodiments, position sensors 346 may be formed as wedge-shaped printed circuit boards to fit efficiently within electromagnetic position control coils 320.

In some embodiments, position sensor 346 may sense the position (including orientation) of item magnet 110 as it is levitated above levitator 300. In some embodiments, position sensor 346 may sense the position of item magnet 110 in greater than three degrees of freedom, for example, 6 degrees of freedom: translation (linear position) and rotation (angular position) in or about each of the x, y, and z axes. In some embodiments, position sensors 346 can sense translation position along the x, y, and z axes by sensing strength or change in magnetic field due to proximity of item magnet 110 to sensing elements of position sensors 346. In some embodiments, position sensors 346 can sense rotation position about the x, y, and z axes by sensing the position of an irregularity 112 in item magnet 110. Irregularity 112 may be, for example, a discontinuity in item magnet 110 (e.g., a hole through item magnet 110, a cavity in item magnet 110, a divot in item magnet 110), a protrusion of item magnet 110's surface, an area of higher or lower density than the balance of item magnet 110, or an area otherwise having different magnetic properties than the balance of item magnet 110. Irregularity 112 is positioned offset from the center of item magnet 110, so that its position is determinative of the orientation of item magnet 110 (and thus item 100). Position sensors 346 may sense a change or difference in magnetic field due to irregularity 110, and from this change or difference control system 340 can determine the position of irregularity 110, and thus the orientation (rotation position) of item magnet 110 about the x, y, and z axes (see, e.g., FIGS. 9 and 14).

Figure 8:
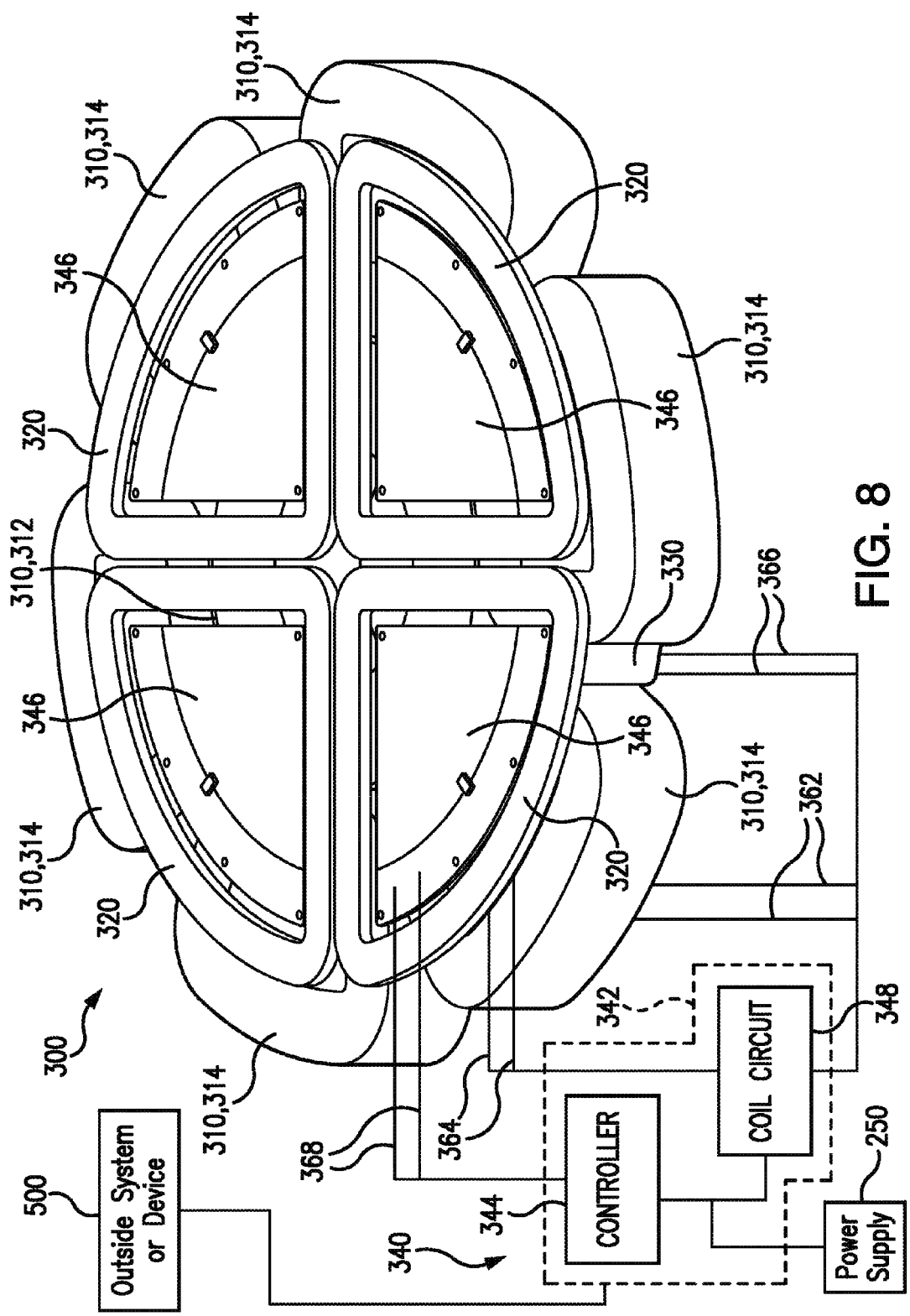
FIG. 8 shows a perspective view of a levitation system according to some embodiments.

Position sensors 346 can thus sense the position of item magnet 110. By sensing the position and its change over time, position sensors 346 can sense both position and motion (static and dynamic) of item magnet 110. Position sensors 346 can send signals representative of the position and motion characteristics (e.g., location, magnitude, angle, rate of change, direction of motion) to controller 344 (see FIG. 8), which in turn may control or change the magnitude and/or direction of current through any of the electromagnetic coils of levitator 300 (e.g., electromagnetic repulsion coils 310, electromagnetic position control coils 320, electromagnetic rotation control coils 330) to constrain motion (e.g., by maintaining or changing the position or motion) of item magnet 110 in six degrees of freedom as described above. For example, controller 344 may maintain or adjust the current through the electromagnetic coils individually through a coil circuit 348, which may include, for example, one or more H-bridges or other electronic circuits that enable voltage to be applied across a load in either direction. Coil circuit 348 may be connected individually to each of coils 310, 320, 330 by coil leads, which are wires (which may be portions of the wires forming each of wire coils 310, 320, 330) that extend from each of coils 310, 320, and 330 and connect to control system 340, as shown, for example, in FIGS. 8 and 10. FIG. 8 shows only a single set of coil leads for each coil: repulsion coil leads 362, position coil leads 364, and rotation coil leads 366. But it should be understood that each coil has its own set of coil leads connected to control system 340 (e.g., to coil circuit 348 or controller 344).

In an example scenario, control system 340 may be programmed to maintain item magnet 110 in a static position centered two inches above levitator 300. If position sensors 346 sense that item magnet 110 is centered only one inch above levitator 300 (e.g., due to a weight applied to item magnet 110), controller 344 may increase the current through electromagnetic repulsion coils 310 to increase repulsion force 380 until item magnet 110 rises to two inches above levitator 300. In a further example scenario, control system 340 may be programmed to maintain item magnet 110 centered two inches above levitator 300, rotating clockwise about the vertical z-axis at a rate of two revolutions per minute. If position sensors 346 sense that item magnet 110's rate of rotation decreases below two revolutions per minute (e.g., due to drag), controller 344 may increase the current through one or more electromagnetic rotation control coils to increase rotation control forces in the clockwise direction. Since item magnet 110 will continue to rotate under its own momentum, controller 344 may send one or more current pulses to generate rotation control force pulses until the desired rotation rate is achieved (here two revolutions per minute).

In some scenarios, levitator 300 may be programmed (preprogrammed or programmed in real time) to achieve a desired position (including orientation) or motion characteristic (e.g., rate or direction of movement) of item 100. These desired characteristics may be defined by target values (which may be ranges), and if item magnet 100 deviates from the target by greater than a predetermined amount, controller 344 may reset its position to the target value by adjusting the magnitude and/or direction of current through any or all of electromagnetic coils 310, 320, and 330.

Because electromagnetic coils 310, 320, and 330 of levitator 300 can be independently controlled and together can be driven to control the position and motion of item magnet 110 in 6 degrees of freedom, levitator 300 can maintain an item in any desired position or orientation, statically or dynamically. This makes it well-suited to levitate items 100 that are asymmetric—for example those that have uneven weight distribution. Since levitator 300 can tilt item magnet 110, it can also tilt item 100 that contains item magnet 110. So if item 100 were, for example, a watch having an asymmetric shape and uneven weight distribution, levitator 300 could still levitate it at a desired angle (e.g., to present the watch face tilted upward toward a potential viewer or purchaser in a retail setting) by adjusting the magnitude and direction of current through electromagnetic coils 310, 320, and 330. Or if item 100 were, for example, a cylindrical computer housing having a generally symmetrical shape but an uneven weight distribution (e.g., due to the positioning of internal components), levitator 300 could still levitate it in a vertical position (e.g., to show it as it would sit on a desk) by adjusting the magnitude and direction of current through electromagnetic coils 310, 320, and 330.

In some embodiments, levitator can be driven to levitate a great weight (e.g., 4-5 kilograms) at a great height (e.g., above 50 millimeters). As one of skill in the art would appreciate, these exemplary values scale inversely (e.g., a lower weight can be levitated at a greater height, and at a lower height a higher weight can be levitated). In some embodiments electromagnetic coils 310, 320, and 330 can be driven at a current density of, for example, 4-7 A/mm$^2$ to provide a magnetic field strong enough to support such weight at such substantial height. In some embodiments, overall power consumption for levitator 300 may be 15-25 kilowatts (kW) (e.g., 20 kW).

In some scenarios position sensors 346 may detect that item magnet 100 is no longer present within their detection range, because it has been removed. In some embodiments, in response to a signal from position sensors 346 that item magnet 100 has been removed, control system 340 may power down levitator 300, and/or may sound an alarm (e.g., to alert a retailer or other person that item 100 has been removed).

Levitator 300 is operated at least in part by current provided by a power supply 250 (e.g., from a wall power outlet or other source, see FIG. 8). In the event of an interruption in power provided by power supply 250 (e.g., due to a power failure), levitator 300 may slowly reduce power to electromagnetic coils 310, 320, and 330, in order to slowly lower item 100 onto the surface of levitator 300. This avoids abruptly dropping item 100 when power is lost. Levitator 300 may include a backup battery to provide the current to drive coils 310, 320, and 330 at decreasing magnitude while lowering item 100 in the event of power loss at power supply 250.

As described above, levitator 300 can control the position (including orientation) and motion of levitated item 100 and item magnet 110 statically or dynamically by driving electromagnetic coils 310, 320, and 330 at various magnitudes and directions. The position and motion of levitated item 100 and item magnet 110 can at the same time be sensed by position sensors 346, which send signals indicative of the position and motion to main controller 342, which, based on the signals, can maintain or adjust the current magnitude and direction of any or all of electromagnetic coils 310, 320, and 330 to maintain or change the position and motion of levitated item 100 and item magnet 110 statically or dynamically. In some embodiments, this feedback loop of control system 340 maintains item 100 in a predetermined position and/or motion. If the item deviates from the predetermined position or motion, the feedback loop senses and corrects it by changing the magnitude and/or direction of current through one or more of electromagnetic coils 310, 320, and 330. In some embodiments, the position and motion of levitated item 100 is controlled in real time, interactively. For example, main controller 342 may receive an input (e.g., from a user or other outside source) and may adjust the position and/or motion of item 100 based on that input in real time (e.g., by adjusting the magnitude and/or direction of current through any or all of electromagnetic coils 310, 320, and 330).

For example, a user may input parameters into a control panel of or connected to main controller 342 to move levitated item 100 in any or all of the six degrees of freedom above levitator 300. Also for example, a microphone or other audio input device may be connected to or part of main controller 342, and the position and/or motion of levitated item may be controlled (e.g., dynamically changed) based on the audio input received by the microphone or other audio input device. For example, levitated item 100 may be made to "dance" to music sensed by the audio input device. It may oscillate, bounce, rotate, translate, tilt, etc. based on any or all of the melody, pitch, harmony, rhythm, tone, form, tempo, timbre, texture, and dynamics of sensed music or other audio input. In some embodiments, a magnitude of change in motion of levitated item 100 may be proportional to a magnitude of an input (e.g., turning a dial on a control panel may cause item 100 to be raised a distance proportional to the amount the dial is turned; a louder sound or faster tempo may cause a greater change in movement than a quieter sound or slower tempo).

In some embodiments, levitator 200, 300 may provide power wirelessly to levitated item 100. For example, magnetic fields generated by levitator 200, 300 may induce current in an induction coil (or other structure capable of having a current induced therein) of item 100, which current may be used to power item 100 or elements thereof. For example, the current induced in item 100 may power a light emitting diode (LEDs), an accelerometer or other sensor, a compass, and/or a display screen of item 100. In cases where item 100 is an electronic device (e.g., a smartphone, smartwatch, or other computing device) the current induced by levitator 200, 300 may power the device itself.

In some embodiments a levitated item 100 can be used as an input to an outside system or device 500 that may be remote from levitator 200, 300 (see FIGS. 2 and 8). For example, item 100 may be levitated in a default position or motion (static or dynamic) in the absence of an outside force applied to item 100, similarly as described elsewhere herein. But when an outside force is applied to move item 100 from the default position or motion, position sensors 346 sense that motion and controller 342 sends a control signal representative of the motion (or applied force) to another device or system, which interprets it as an input. For example, an item 100 may be levitated in a default position centered two inches above levitator 200, 300. If a person pushes levitated item 100 in a first direction (e.g., away from the person), the signal generated by control system 340 due to this motion may be interpreted by outside system or device 500 as an input to increase a parameter (e.g., volume on an audio system, scrolling up or down on a computer program); and if the person pulls levitated item 100 in a second direction (e.g., toward the person), the signal generated by control system 340 due to this motion may be interpreted by outside system or device 500 as an input to decrease the parameter. Control system 340 and outside system or device 500 can be programmed to interpret any motion caused by a person (or other outside force) as any desired input. For example, rather than being pushed or pulled as described above to increase or decrease a parameter, item 100 may be raised or lowered; moved left or right; tilted forward, rearward, leftward, or rightward; or rotated clockwise or counterclockwise. In some embodiments, item 100 can be used as a mouse input for a computer, such that the motion of a cursor or other on-screen element is directed by motion of item 100. In some embodiments, item 100 can be used as a joystick or other virtual control (e.g., in a video game or computer-aided-design (CAD) program) to control motion of another item 100 or a virtual item (e.g., to manipulate a three-dimensional rendering of an object in a CAD or other program). In such embodiments, the other item 100 or virtual item may mimic the motion of item 100 moved by the user.

In some embodiments (e.g., where item 100 is used as a control or input for an outside system or device 500), item 100 may provide tactile feedback to the user manipulating it. For example, resistance to motion may be increased as item 100 is moved farther from its default state (e.g., by increasing appropriate electromagnetic coils 310, 320, 330). Or such resistance may be a constant force opposing the change in position or rotation. In some embodiments, item 100 may pulse to provide a kind of haptic feedback as it is moved (e.g., rapid repeated increases and decreases in resistance to motion to evoke a buzzing, clicking, or vibrating feeling as item 100 is turned).

In some embodiments, multiple levitators 200, 300 are used together in a levitation system. Such a configuration may be useful, for example, in a retail setting to display different types of products or similar products having different specifications. In some embodiments certain of the displayed items 100 may be made to move by levitators 200, 300 in order to draw attention to them (e.g., by oscillating (e.g., up-and-down, side-to-side, or rotating back-and-forth), bouncing, twirling, being raised (e.g., above others), being lowered (e.g., below others), being turned in a direction different from others, being turned toward a location (e.g., that of a control panel or customer)). These certain items 100 may be those that meet a certain criteria. The criteria may be parameters input (e.g., into a control panel linked to control system 240, 340) by a customer (e.g., to highlight those items that match specifications for which the customer is searching). The criteria may be set by a retailer (e.g., to highlight items that are on new or on sale).

Electromagnetic coils described herein may be formed of coiled electrically conductive material, such as wire (e.g., copper wire or aluminum wire). The gauge, length, number and arrangement of turns, and coil direction may be varied as would be understood by one of skill in the art to produce or be capable of producing a desired magnetic field output for an intended current input.

Electromagnetic coils described herein may be replaced or supplemented with permanent magnets or any other structure that generates a magnetic field, and permanent magnets described herein may be replaced or supplemented with electromagnetic coils or any other structure that generates a magnetic field to achieve some or all of the functions described herein, as would be understood by one of skill in the art.

The above describes embodiments of the present invention with particular reference to two example levitators: levitator 200 and levitator 300. As one of skill in the art would appreciate, described structural features, operation, and potential use cases of each of levitators 200 and 300 can be applied independently to or interchanged with features of other levitators, including the other of levitators 200 and 300.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein.

The Detailed Description section is intended to be used to interpret the claims. The Summary and Abstract sections may set forth one or more but not all exemplary embodiments of the present invention as contemplated by the inventor(s), and thus, are not intended to limit the present invention and the appended claims.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined only in accordance with the following claims and their equivalents.

What is claimed is:

1. A levitator, comprising:
a repulsion wire coil having a vertical coil axis;
a position control wire coil having a vertical coil axis;
a rotation control wire coil having a horizontal coil axis; and
a controller coupled to each of the repulsion wire coil, position wire coil, and rotation wire coil, wherein the controller is configured to independently control currents provided to each of the repulsion wire coil, position wire coil, and rotation wire coil.

2. The levitator of claim 1, comprising:
a position sensor that senses the position of a levitated item,
wherein the current provided to each of the repulsion wire coil, position wire coil, and rotation wire coil is based on the position of the levitated item.

3. The levitator of claim 2, wherein the position sensed by the position sensor includes the linear position and angular position of the levitated item.

4. The levitator of claim 2, wherein the position sensor is a magnetic field sensor.

5. The levitator of claim 2, wherein the position sensor has a variable output based on the strength of an incident magnetic field.

6. The levitator of claim 2, wherein the position sensor is a Hall-effect sensor.

7. The levitator of claim 1, comprising a plurality of position sensors that together sense the position of a levitated item,
wherein the current provided to each of the repulsion wire coil, position wire coil, and rotation wire coil is based on the position of the levitated item.

8. The levitator of claim 1, comprising a plurality of repulsion wire coils, wherein the plurality of repulsion wire coils comprise:
a single central repulsion coil; and
a plurality of peripheral repulsion coils positioned at equal intervals around the central repulsion coil.

9. The levitator of claim 8, wherein the central repulsion wire coil is circular, and
wherein each of the peripheral repulsion wire coils has a shape defined by a longer outer arc and a shorter inner arc connected by two side segments.

10. The levitator of claim 8, wherein each of the plurality of repulsion wire coils has a coil axis parallel to coil axes of the others of the plurality of repulsion wire coils.

11. The levitator of claim 8, wherein the plurality of peripheral repulsion coils consists of six peripheral repulsion coils.

12. The levitator of claim 1, comprising a plurality of position wire coils, wherein the plurality of position wire coils are disposed above the repulsion wire coil and positioned at equal intervals around a central vertical axis of the levitator.

13. The levitator of claim 12, wherein each of the position wire coils has a shape defined by an outer arc and two side segments extending from ends of the outer arc and meeting at an inner apex.

14. The levitator of claim 12, wherein each of the plurality of position wire coils has a coil axis parallel to coil axes of the others of the plurality of position wire coils.

15. The levitator of claim 12, wherein each of the plurality of position wire coils is positioned opposite another of the plurality of position wire coils.

16. The levitator of claim 12, wherein the plurality of peripheral position wire coils consists of four position wire coils.

17. The levitator of claim 1, comprising a plurality of rotation wire coils, wherein the plurality of rotation wire coils are positioned at equal intervals around a central vertical axis of the levitator.

18. The levitator of claim 17, comprising a plurality of repulsion wire coils positioned at equal intervals around the central vertical axis of the levitator, and
wherein each of the rotation wire coils is disposed between two adjacent repulsion wire coils.

19. The levitator of claim 17, wherein each of the plurality of rotation wire coils has a coil axis non-parallel to a coil axis of at least one of the others of the plurality of rotation wire coils.

20. The levitator of claim 17, wherein each of the plurality of rotation wire coils has a coil axis tangential to an imaginary circle centered on the central vertical axis of the levitator.

21. The levitator of claim 17, wherein each of the plurality of rotation wire coils is positioned opposite another of the plurality of rotation wire coils.

22. The levitator of claim 1, comprising:
a plurality of repulsion wire coils, wherein the plurality of repulsion wire coils comprise:
a single central repulsion coil centered around a central vertical axis of the levitator; and
a plurality of peripheral repulsion coils positioned at equal intervals around the central repulsion coil;
a plurality of position wire coils, wherein the plurality of position wire coils are disposed above the plurality of repulsion wire coils and positioned at equal intervals around the central vertical axis of the levitator; and
a plurality of rotation wire coils, wherein the plurality of rotation wire coils are positioned at equal intervals around the central vertical axis of the levitator.

23. The levitator of claim 22, wherein the controller is coupled to each of the plurality of repulsion wire coils, each of the plurality of position wire coils, and each of the plurality of rotation wire coils, and
wherein the controller is configured to independently control current provided to each of the plurality of repulsion wire coils, each of the plurality of position wire coils, and each of the plurality of rotation wire coils.

24. The levitator of claim 23, comprising:
a position sensor that senses the position of a levitated item,
wherein the currents provided to each of the plurality of repulsion wire coils, each of the plurality of position wire coils, and each of the plurality of rotation wire coils are based on the position of the levitated item.

25. A levitation system comprising:
a levitator comprising wire coils that produce a magnetic field when energized;
a magnetic-field-producing item that becomes levitated above the energized wire coils by the magnetic field when the magnetic-field-producing item is disposed above the energized wire coils; and
a controller that can dynamically control the position of the magnetic-field-producing item by controlling the current energizing the wire coils,
wherein the controller can selectively rotate the magnetic-field-producing item and control its speed of rotation and orientation by controlling the current energizing the coils.

26. The levitation system of claim 25, wherein the controller can dynamically control the vertical and lateral position of the magnet by controlling the current energizing the coils.

27. The levitation system of claim 25, comprising a feedback sensor that can sense the position of the levitated magnetic-field-producing item.

28. The levitation system of claim 27, wherein the position sensed by the feedback sensor includes the lateral position, vertical position, and angular position of the levitated magnetic-field-producing item.

29. The levitation system of claim 25, wherein the magnetic field produced by the magnetic-field-producing item is irregular about a central axis of the magnetic field produced by the magnetic-field-producing item.

30. The levitation system of claim 29, wherein the irregularity in the magnetic field produced by the magnetic-field-producing item is due to an irregularity in the substance of the magnetic-field-producing item.

31. The levitation system of claim 30, wherein the magnetic-field-producing item is a permanent magnet, and wherein the irregularity in the substance of the magnetic-field-producing item is a cavity in the permanent magnet or a hole through the permanent magnet.

32. The levitation system of claim 29, comprising a feedback sensor that can sense the position of the levitated magnetic-field-producing item at least in part by sensing the irregularity in the magnetic field produced by the magnetic-field-producing item.

33. A method for controlling a levitated item, the method comprising:
producing a repulsive magnetic field to levitate a magnetic-field-producing item;
sensing a rate of rotation of the magnetic-field-producing item; and
constraining motion of the magnetic-field-producing item in greater than three degrees of freedom by energizing wire coils with electrical current,
wherein constraining motion of the magnetic-field-producing item comprises rotating the magnetic-field-producing item at a controlled rate.

34. The method of claim 33, wherein constraining motion of the magnetic-field-producing item comprises moving the magnetic-field-producing item vertically or laterally to a desired position.

35. The method of claim 33, comprising:
sensing a position and orientation of the magnetic-field-producing item;
determining if the position and orientation of the magnetic-field-producing item deviate from a target position and orientation; and
adjusting the amount of electrical current energizing the wire coils to move the magnetic-field-producing item to the target position and orientation.

36. The method of claim 33, comprising:
determining if a sensed motion characteristic of the magnetic-field-producing item deviates from a target motion for the magnetic-field-producing item; and
adjusting the amount of electrical current energizing the wire coils to change the motion of the magnetic-field-producing item to match the target motion.

37. The method of claim 33, wherein the rate of rotation is sensed by sensing the position of an irregularity in the magnetic field produced by the magnetic-field-producing item.

38. The method of claim 33, wherein constraining motion of the magnetic-field-producing item comprises dynamically moving the magnetic-field-producing item in response to an input.

39. The method of claim 33, wherein constraining motion of the magnetic-field-producing item comprises at least one of raising the magnetic-field-producing item, lowering the magnetic-field-producing item, oscillating the magnetic-field-producing item by alternatingly raising and lowering the magnetic-field-producing item, or oscillating the magnetic-field-producing item by alternatingly rotating the magnetic-field-producing item in different directions.

40. The method of claim 33, wherein constraining motion of the magnetic-field-producing item comprises dynamically moving the magnetic-field-producing item in response to a dynamic input,
wherein a magnitude of change in motion of the magnetic-field-producing item is proportional to a magnitude of change in the dynamic input.

41. The method of claim 33, wherein constraining motion of the magnetic-field-producing item comprises dynamically moving the magnetic-field-producing item in response to a dynamic audio input,
wherein direction and magnitude of motion of the magnetic-field-producing item are based on at least one of melody, pitch, harmony, rhythm, tone, form, tempo, timbre, texture, and dynamics of the audio input.

42. A method for producing a control signal using a levitated item, the method comprising:
sensing a position and orientation of a magnetically-levitated item;
sensing a change in the position or orientation of the magnetically-levitated item due to an external force applied to the magnetically-levitated item;
generating a control signal based on the change in position or orientation of the magnetically-levitated item; and
transmitting the control signal to control a device remote from the magnetically-levitated item and remote from a levitator levitating the magnetically-levitated item.

43. The method of claim 42, wherein the change in position is a tilting of the magnetically-levitated item.

44. The method of claim 43, wherein a control signal instructing a parameter increase is generated in response to tilting of the magnetically-levitated item in a first direction,
wherein a control signal instructing a parameter decrease is generated in response to tilting of the magnetically-levitated item in a second direction, and
wherein the second direction is different from the first direction.

45. The method of claim 42, wherein the change in position is a rotation of the magnetically-levitated item.

46. The method of claim 45, wherein a control signal instructing a parameter increase is generated in response to rotation of the magnetically-levitated item in a first direction,
wherein a control signal instructing a parameter decrease is generated in response to rotation of the magnetically-levitated item in a second direction, and
wherein the second direction is different from the first direction.

47. The method of claim 42, further comprising resisting the change in position or orientation to provide tactile feedback through the magnetically-levitated item.

48. The method of claim 47, wherein the resistance is a constant force opposing the change in position or rotation.

49. The method of claim 47, wherein the resistance is a dynamic force increasing in magnitude as the change in position or orientation continues.

50. The method of claim 47, wherein the resistance is a pulsing force repeatedly increasing and decreasing in magnitude as the change in position or orientation continues.

51. The method of claim 42, wherein the media device is an audio system or a computer, and wherein the magnetically-levitated item acts as a user input to the audio system or computer based on the external applied force.

* * * * *